US007676797B2

(12) United States Patent
Broadhurst

(10) Patent No.: US 7,676,797 B2
(45) Date of Patent: Mar. 9, 2010

(54) SYSTEM AND METHOD FOR MANAGING LONG NAMES IN AN APPLICATION PROGRAMMING INTERFACE

(75) Inventor: James Broadhurst, Batavia, IL (US)

(73) Assignee: Computer Associates Think, Inc., Islandia, NY (US)

( * ) Notice: Subject to any disclaimer, the term of this patent is extended or adjusted under 35 U.S.C. 154(b) by 815 days.

(21) Appl. No.: 11/047,101

(22) Filed: Jan. 31, 2005

(65) Prior Publication Data

US 2006/0173931 A1    Aug. 3, 2006

(51) Int. Cl.
G06F 9/45 (2006.01)
H03M 7/00 (2006.01)
G06F 9/455 (2006.01)

(52) U.S. Cl. .................. 717/138; 717/136; 341/50; 703/23; 703/26; 703/27

(58) Field of Classification Search .................. 717/110, 717/113–119, 124, 134–138; 707/100, 23, 707/26, 27; 341/50, 90, 104–106
See application file for complete search history.

(56) References Cited

U.S. PATENT DOCUMENTS

| | | | |
|---|---|---|---|
| 4,933,847 A * | 6/1990 | Chau et al. .................. 712/236 |
| 5,307,494 A | 4/1994 | Yasumatsu et al. |
| 5,414,834 A * | 5/1995 | Alexander et al. .......... 707/100 |
| 5,414,841 A * | 5/1995 | Bingham et al. ............ 707/100 |
| 5,680,586 A * | 10/1997 | Elkins et al. .................. 703/27 |
| 5,682,158 A * | 10/1997 | Edberg et al. ................. 341/90 |
| 5,745,902 A | 4/1998 | Miller et al. |
| 5,751,982 A * | 5/1998 | Morley ........................ 712/209 |
| 5,754,845 A * | 5/1998 | White .......................... 707/10 |
| 5,758,152 A | 5/1998 | LeTourneau |
| 5,758,352 A | 5/1998 | Reynolds et al. |
| 5,765,169 A | 6/1998 | Conner |
| 5,787,431 A | 7/1998 | Shaughnessy |
| 5,793,381 A * | 8/1998 | Edberg et al. ............... 345/467 |
| 5,963,155 A * | 10/1999 | Cheng et al. .................. 341/90 |
| 5,991,777 A | 11/1999 | Momoh et al. |

(Continued)

OTHER PUBLICATIONS

Adams, Glenn, "Internationalization and Character Set Standards," Sep. 1993, ACM, p. 31-39.*

(Continued)

Primary Examiner—Wei Y Zhen
Assistant Examiner—Qing Chen
(74) Attorney, Agent, or Firm—Pillsbury Winthrop Shaw Pittman LLP

(57) ABSTRACT

Software managing long names in an application programming interface receives a request to perform a requested operation on one or more fields, the application comprising a first operation operable to perform the requested operation on at least one field type. The software determines whether the field type of any of the fields is incompatible with the first operation. If the field types of the one or more fields are compatible with the first operation, then the software performs the requested operation on the one or more fields using the first operation. If the software determines that the field type of at least one of the fields is incompatible with the first operation, then it converts the request into a call for a second operation operable to perform the requested operation on the one or more fields and performs the requested operation using the second operation.

24 Claims, 2 Drawing Sheets

U.S. PATENT DOCUMENTS

| | | | | |
|---|---|---|---|---|
| 6,112,024 | A | 8/2000 | Almond et al. | |
| 6,147,628 | A * | 11/2000 | Dyche et al. | 341/60 |
| 6,166,666 | A * | 12/2000 | Kadyk | 341/87 |
| 6,204,782 | B1 * | 3/2001 | Gonzalez et al. | 341/90 |
| 6,286,013 | B1 | 9/2001 | Reynolds et al. | |
| 6,292,933 | B1 | 9/2001 | Bahrs et al. | |
| 6,370,531 | B1 * | 4/2002 | Boutcher et al. | 707/10 |
| 6,374,265 | B1 | 4/2002 | Chen et al. | |
| 6,400,287 | B1 * | 6/2002 | Ehrman | 341/55 |
| 6,438,516 | B1 * | 8/2002 | Davis | 704/8 |
| 6,658,625 | B1 * | 12/2003 | Allen | 715/236 |
| 6,691,119 | B1 | 2/2004 | Lippert et al. | |
| 6,861,963 | B1 * | 3/2005 | Steele et al. | 341/50 |
| 6,910,183 | B2 * | 6/2005 | Maier et al. | 715/205 |
| 7,167,968 | B2 * | 1/2007 | Busaba et al. | 711/201 |
| 7,188,115 | B2 * | 3/2007 | Farn et al. | 707/100 |
| 7,218,252 | B2 * | 5/2007 | Fauque | 341/50 |
| 7,251,667 | B2 * | 7/2007 | Atkin | 707/104.1 |
| 7,278,100 | B1 * | 10/2007 | Ehrman | 715/264 |
| 7,299,452 | B1 * | 11/2007 | Zhang et al. | 717/124 |
| 2002/0052902 | A1 * | 5/2002 | Bauer | 707/536 |
| 2003/0074177 | A1 | 4/2003 | Bowen | 703/22 |
| 2003/0182103 | A1 * | 9/2003 | Atkin | 704/9 |
| 2004/0261024 | A1 * | 12/2004 | Storisteanu | 715/530 |
| 2005/0184886 | A1 * | 8/2005 | Fauque | 341/50 |

OTHER PUBLICATIONS

Hoschka, Philipp, "Compact and Efficient Presentation Conversion Code," Aug. 1998, IEEE, p. 389-396.*

Sommers, Frank, et al., "Cluster-Based Computing with Active, Persistent Objects on the Web", *Cluster Computing,* 2001, Proceedings, 2001 IEEE International Conference on [online], 2001 [retrieved on Jun. 10, 2007], retrieved from the Internet: <URL: http://dblab.usc.edu/Users/shahram/cluster/cluster2001.pdf>.

* cited by examiner

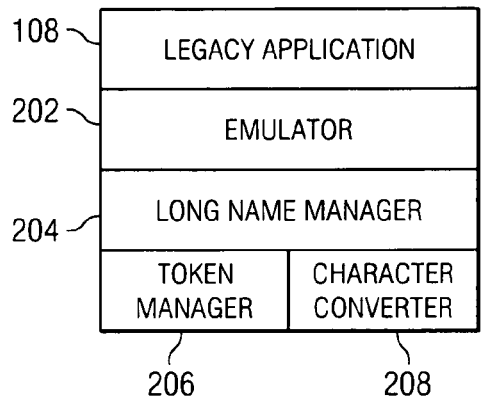
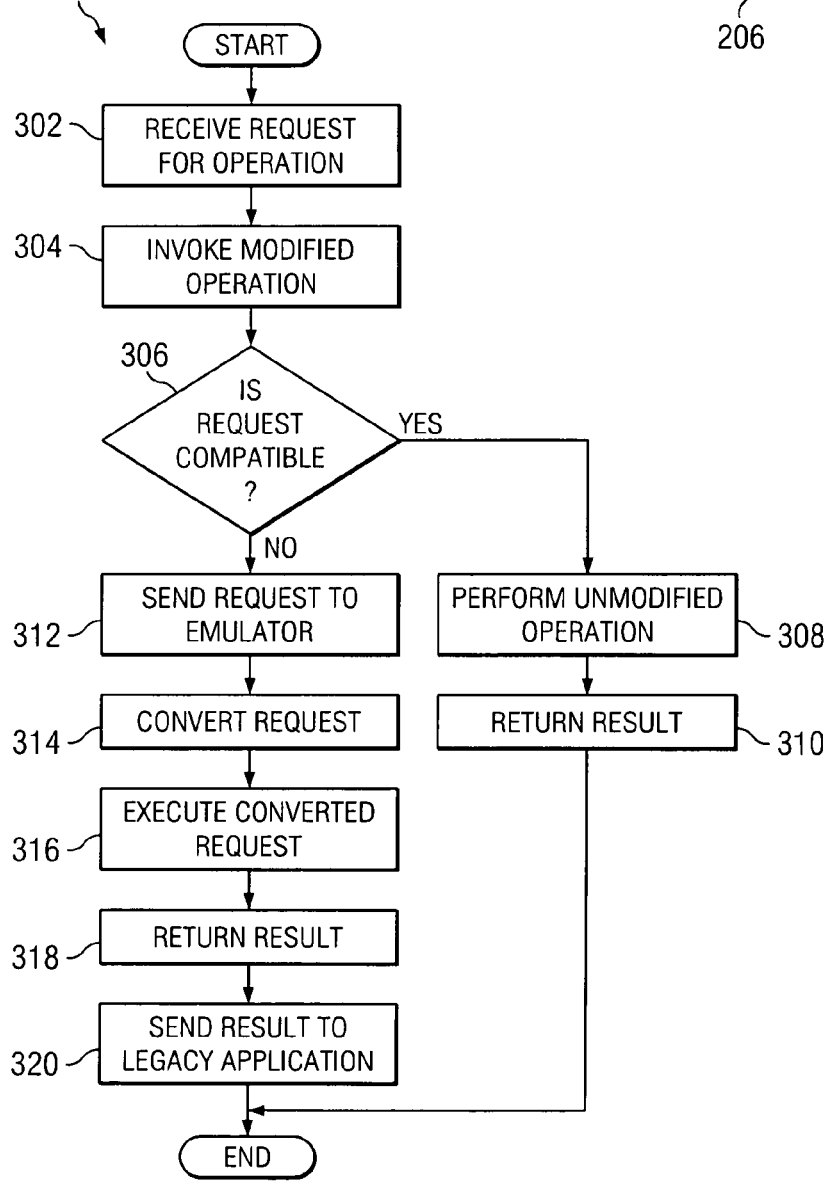

SYSTEM AND METHOD FOR MANAGING LONG NAMES IN AN APPLICATION PROGRAMMING INTERFACE

TECHNICAL FIELD

This disclosure generally relates to data processing and, more specifically, to as system and method for managing long names in an application programming interface.

BACKGROUND

Migration to new architectures frequently presents difficulties associated with legacy applications. For example, the permitted size of fields may be expanded to allow larger values, which may create difficulties in using those values in legacy applications. In a particular case, an application programming interface using Extended Binary Coded Decimal Interchange Code (EBCDIC) may migrate to UNICODE. A Long Name Manager is typically a layer in the application programming interface that expands tokens representing longer strings in character fields, which may overcome some compatibility problems in legacy applications. But incorporating the Long Name Manager into legacy applications may still require changing a large amount of source code to enable calls to the functions of the Long Name Manager.

SUMMARY

This disclosure provides a system and method for managing long names in an application programming interface. Various embodiments reduce or eliminate drawbacks associated with conventional systems. In one embodiment, software managing long names in an application programming interface receives a request to perform a requested operation on one or more fields, the application comprising a first operation operable to perform the requested operation on at least one field type. The software determines whether the field type of any of the fields is incompatible with the first operation. If the field types of the one or more fields are compatible with the first operation, then the software performs the requested operation on the one or more fields using the first operation. If the software determines that the field type of at least one of the fields is incompatible with the first operation, then it converts the request into a call for a second operation operable to perform the requested operation on the one or more fields and performs the requested operation using the second operation. The details of one or more embodiments of the disclosure are set forth in the accompanying drawings and the description below. Particular features, objects, and advantages of the disclosure will be apparent from the description and drawings and from the claims.

DESCRIPTION OF DRAWINGS

FIG. 2 illustrates an example layer diagram having an emulator and a long name manager; and FIG. 3 is a flow chart showing an example method for managing fields in an application programming interface.

DETAILED DESCRIPTION

Figure 1:
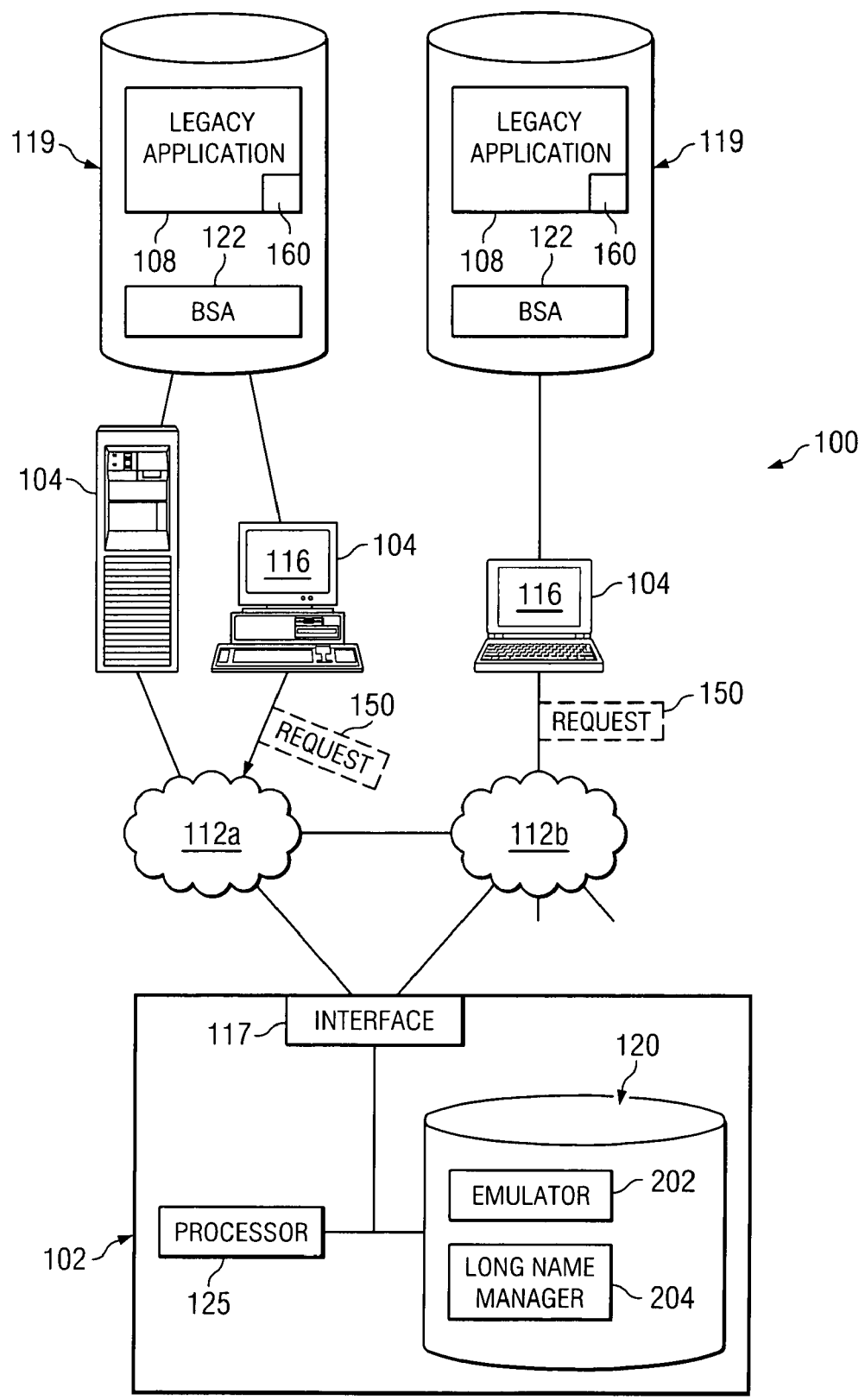
FIG. 1 illustrates a distributed application environment including a server with an emulator and a long name manager in accordance with one embodiment of the present disclosure.

FIG. 1 illustrates a distributed application environment 100 for at least a portion of enterprise or data processing environment in accordance with an embodiment of the present disclosure. Generally, environment 100 represents at least a portion of an enterprise that includes or is communicably coupled with some or all of server 102 and one or more clients 104. Often, such components may communicate with one another using protocols, which facilitate the exchange of data and metadata. Indeed, such a protocol may be considered one form of an Application Programming Interface (API). APIs are often customized for specialized components, and across an enterprise, a number of different APIs may be used on multiple platforms.

Environment 100 may be a distributed client/server system, but environment 100 may also be a standalone computing environment or any other suitable environment, such as an administrator accessing data stored on server 102, without departing from the scope of this disclosure. Generally, environment 100 provides an API that includes an instruction emulator 202 having functions that can be called based on requests 150 from legacy applications 108. "Legacy applications" refer to any API in environment 100 intended to interface with a long name manager 204 and/or other APIs that use fields incompatible with the particular legacy application 108. For example, the fields used by other APIs may exceed a characteristic maximum size associated with a particular legacy application 108. In one example of such a maximum size, character fields in a particular legacy application 108 using EBCDIC may be limited to 8 or 18 bytes, while other APIs may use larger character fields. In another example, the field may contain an indicator, such as a token, representative of additional information, such that the total size of the field with the additional information would exceed a maximum size for the legacy application 108. In another example, legacy application 108 may use one type of characters, such as EBCDIC, while other APIs use a different character scheme, such as UNICODE. In this example, environment 100 may place tokens in these fields as well, thereby shielding the complexities of character conversion from most of legacy application 108.

"Requests" refer to any command, instruction, message, query, or similar information that includes an identifier associated with one or more functions of a long name manager 204. Although the term "legacy applications" is used, it should be understood that legacy applications 108 need not be in place in environment 100 before other APIs are added; legacy applications 108 may also be introduced into environment 100 concurrently or subsequently to the installation of other APIs. Emulator 202 in turn converts request 150 into calls used to call functions of long name manager 204. Thus, emulator 202 may allow functions of long name manager 204 to be called based on requests 150 without requiring legacy applications 108 to handle fields incompatible with legacy application 108. This in turn may allow legacy applications 108 to be used with other APIs without extensive changes to the source code. For example, environment 100 provides emulator 202 and long name manager 204 to allow legacy code written in assembler for a z/Architecture environment to work with UNICODE data and/or data fields that have expanded in length. The service provides a framework for emulating instructions using other layers of software that perform token management and character conversions. The token management service can generate a token to represent a string and return the string value for a given token. Instead of expanding a field in a data structure to accommodate a larger string, a token that represents the string is put in the field. For example, environment 100 may implement or include the z/architecture. In this architecture, assembler language coding the instruction to compare two fields is a CLC instruction. The instruction to copy the contents from on field to another is a MVC instruction. These instructions will not typically work when one field is greater than the other. Therefore, environment 100 may implement two macros, MVC$ and CLC$, that emulate the MVC and CLC z/architecture instructions. In this example, a macro is a z/architecture assembler language feature that allows defining a group of instructions that can be generated from a single line of source code. In other words, environment 100 typically allows existing code to continue to work with fields that contain tokens by changing the CLC or MVC in an instruction to CLC$ or MVC$. Accordingly, any example CLC instruction may be changed to a CLC$ macro call and the operands do not need to be changed. The expansion of the macro includes the original CLC instruction, however, instead of the instruction being executed directly, a call to an emulation routine is generated. The address of the instruction to emulate is passed as a parameter. The expansion of this example CLC$ macro requires only twelve additional bytes, whereas a standard long name call may require over one-hundred bytes.

Returning to the illustrated embodiment, server 102 includes memory 120 and processor 125 and comprises an electronic computing device operable to receive, transmit, process and store data associated with environment 100. For example, server 102 may be any computer or processing device such as a mainframe, a blade server, general-purpose personal computer (PC), MACINTOSH, workstation, UNIX-based computer, or any other suitable device. Server 102 may be considered to provide an API for applications executing on clients 104 to resources 106. Generally, FIG. 1 provides merely one example of computers that may be used with the disclosure. In other words, the present disclosure contemplates computers other than general purpose computers as well as computers without conventional operating systems. As used in this document, the term "computer" is intended to encompass a personal computer, workstation, network computer, or any other suitable processing device. For example, although FIG. 1 illustrates one server 102 that may be used with the disclosure, environment 100 can be implemented using computers other than servers, as well as a server pool. Server 102 may be adapted to execute any operating system 110 including z/OS, LINUX-INTEL or LINUX1390, LINK, WINDOWS SERVER, or any other suitable operating system. According to one embodiment, server 102 may also include or be communicably coupled with a web server and/or an SMTP server.

Memory 120 may include any memory or database module and may take the form of volatile or non-volatile memory including, without limitation, magnetic media, optical media, random access memory (RAM), read-only memory (ROM), removable media, or any other suitable local or remote memory component. In this embodiment, illustrated memory 120 includes emulator 202 and long name manager 204. Emulator 202 represents a set of instructions executed by processor 125 to convert requests 150 received from clients 104 to "long name instructions," which refers to any calls for functions of long name manager 204. Long name manager 204 represents any set of instructions executed by processor 125 to make available various operations on fields that are incompatible with a type of field processed by legacy application 108. It may be the case that legacy application 108 is not capable of performing the operation on fields of that size, that the operation can be performed but would be performed substantially less efficiently than desired, or that there is another reason that it would be unsuitable for legacy application 108 to perform the operation on that type of field. In any case, emulator 202 allows legacy applications 108 to call functions of long name manager 204 to process field types that otherwise could not or would not be processed by legacy application 108.

Server 102 may also include interface 117 for communicating with other computer systems, such as client 104, over network 112 in a client-server or other distributed environment. In certain embodiments, server 102 receives requests 150 from local or remote senders through interface 117 for storage in memory 120 and/or processing by processor 125. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals.

Network 112 facilitates wireless or wireline communication between computer server 102 and any other local or remote computer, such as clients 104. Indeed, while illustrated as two networks, internal network 112a and external network 112b respectively, network 112 may be a continuous network without departing from the scope of this disclosure, so long as at least portion of network 112 may facilitate communications between senders and recipients of requests 150 and results. In other words, network 112 encompasses any internal and/or external network, networks, sub-network, or combination thereof operable to facilitate communications between various computing components in environment 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations.

Client 104 is any local or remote computing device operable to receive requests from the user via a user interface 116, such as a GUI, a CLI (Command Line Interface), or any of numerous other user interfaces. Thus, where reference is made to a particular interface, it should be understood that any other user interface may be substituted in its place. In various embodiments, each client 104 includes at least GUI 116 and memory 119 and comprises an electronic computing device operable to receive, transmit, process and store any appropriate data associated with environment 100, including legacy applications 108 and bootstrap area (BSA) 122. Generally, BSA 122 is a small block (such as about 100 bytes) that the user or client 104 makes addressable for emulator 202 calls. An initialization call on the BSA 122 is often done before it is used. Once initialized, BSA 122 may be copied and multiple blocks can be referencing the same work area. The work area is any block that may be supplied by the caller on an initialization call. If not supplied by the user one can be obtained. Typically, each work area is anchored to the BSA 122. It contains the save area that will be used by the initialization routine and the instruction emulation routine and working storage for the emulation routines.

It will be understood that there may be any number of clients 104 communicably coupled to server 102. For example, illustrated clients 104 include one local client 104 and one client 104 external to the illustrated portion of enterprise 100. Further, "client 104" and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers to submit or review requests 150 via GUI 116. As used in this disclosure, client 104 is intended to encompass a personal computer, touch screen terminal, workstation, network computer, kiosk, wireless data port, wireless or wireline phone, personal data assistant (PDA), one or more processors within these or other devices, or any other suitable processing device. For example, client 104 may comprise a computer that includes an input device, such as a keypad, touch screen, mouse, or other device that can accept information, and an output device that conveys information associated with the operation of server 102 or clients 104, including digital data, visual information, or GUI 116. Both the input device and output device may include fixed or removable storage media such as a magnetic computer disk, CD-ROM, or other suitable volatile or non-volatile media to both receive input from and provide output to users of clients 104 through the display, namely GUI 116.

GUI 116 comprises a graphical user interface operable to allow the user of client 104 to interface with at least a portion of environment 100 for any suitable purpose. Generally, GUI 116 provides the user of client 104 with an efficient and user-friendly presentation of data provided by or communicated within environment 100. For example, GUI 116 may be a front-end of an application executing on client 104 that is operable to submit SQL queries 150 to one or more data resources 106. GUI 116 may comprise a plurality of customizable frames or views having interactive fields, pull-down lists, and buttons operated by the user. In one embodiment, GUI 116 presents information associated with queries 150 and buttons and receives commands from the user of client 104 via one of the input devices. Moreover, it should be understood that the term graphical user interface may be used in the singular or in the plural to describe one or more graphical user interfaces and each of the displays of a particular graphical user interface. Therefore, GUI 116 contemplates any graphical user interface, such as a generic web browser or touch screen, that processes information in environment 100 and efficiently presents the results to the user. Server 102 can accept data from client 104 via the web browser (e.g., MICROSOFT INTERNET EXPLORER or NETSCAPE NAVIGATOR) and return the appropriate HTML or XML responses using network 112. For example, server 102 may receive such a request 150 from client 104 using the web browser and then execute an operation in response.

In operation, environment 100 allows legacy applications 108 to function in environment 100 with other APIs. To incorporate legacy applications 108 into environment 100, legacy applications 108 are altered in order to change a base set of operation into modified operations 160 that include one or more identifiers corresponding to functions of long name manager 204. For example, each of the modified operations 160 may have or accept two operands, &OP1 and &OP2. In this example embodiment, the format of an operand is (operand, operand-type, operand-ccsid, operand-length-override), where:

operand: anything acceptable to the appropriate assembler.
operand-type:
'T': The operand is a token-enabled CHAR field. This is the default if not specified, the operand does NOT begin with "=", and the type attribute of the operand is not halfword.
'C': the operand is a char field that will NOT contain a token. This is the default if not specified AND if the operand begins with "=".
'V': the operand is a varchar field that will NOT contain a token. The format of a varchar is a halfword length followed by the data. This is the default if not specified and the operand type attribute is halfword.
operand-ccsid:
'P': the operand uses the PRIMARY encoding scheme. This is the default if not specified and the operand does not begin with "=".
'S': the operand uses the SECONDARY encoding scheme. This is the default if not specified and the operand is a char field (type C) or varchar field (type V) that does not begin with "=".
'H': the operand uses the HLASM encoding scheme. This is the default if not specified and the operand begins with "=".
operand-length-override:
If not specified the length associated with each operand will default as follows:
operand 1: It will default to the length in the in the instruction being emulated (as determined by the assembler).
operand 2: If is a valid symbol it will default to the length associated with the symbol. If it is not a valid symbol it will default to the length in the instruction being emulated (as determined by the assembler)
To override the above defaults you can explicitly specify a length up to 32,765. For VARCHAR type operands the length must include the two bytes for the halfword length.

The Primary, Secondary, and HLASM CCSID concept allows coding instructions without the need to explicitly specify the CCSID (or encoding scheme) of each operand. The Primary and Secondary CCSID can be set dynamically such as at execution time. The HLASM CCSID is usually the CCSID of constants generated by the appropriate assembler. For each operand, the operand-ccsid is normally either explicitly coded as the PRIMARY or SECONDARY CCSID or it will default.

When an operation on a field is requested, legacy application 108 executes modified operation 160. In a particular embodiment, modified operations 160 check to see whether the field is compatible with legacy application 108 by examining the field for an indicator, such as a token placed in the field. If the field is compatible with legacy application 108, legacy application 108 may be performed in the same manner as it would have been performed per the unmodified instructions. On the other hand, if the field is determined not to be compatible with legacy application 108, modified operation 160 communicates a request 150 to emulator 202, which converts request 150 into a long name instruction. For example, the instruction to emulate and its operands are passed as parameters. Before invoking, register 0-register 15 are typically saved in illustrated BSA 122. This is both to preserve the callers registers and because emulating the instruction often uses the contents of the base registers for the operands when the service was invoked. If operand types or operand-ccsid information were not explicitly specified, default values are usually assigned. The standard instruction prefix may be calculated, retrieved, identified, or otherwise determined based on the operand types and CCSID specifications. For example, emulator 202 may be operable to receive control in 31-bit mode with R1 containing the address of BSA 122 and R0 containing the address of the instruction prefix followed by the instruction to be emulated. The addresses of the each operand of the instruction are typically computed by examining the machine code of the instruction to be emulated. Each operand is normally in a D(B) form, which is two bytes with the first nibble being the base register (0-F) and the next 3 nibbles comprising the displacement. To compute the address, the value of the base register at the time the instruction to be emulated was executed is multiplied by four and then used as index into a table containing the execution time registers. This table is formed using register values saved in the BSA 122, illustrated in client 104. The instruction length is also obtained from the machine code. When setting the operand lengths if the override lengths in the instruction prefix are zero then the length from the machine instruction will be used. At the end of this first block of code:

R8: will still point to standard instruction prefix
R3: will contain the address of operand 2
R4: will contain the address of operand 1
R6: will contain the length of operand 1
R7: will contain the length of operand 2

A two level branch process is done to invoke the appropriate code that will emulate the instruction with the appropriate CCSID information set. The standard instruction prefix contains the index value for each level of branching. The first level of branching uses the 5th byte of the instruction prefix as an index into a branch table. The branch table will branch to a block of code that sets 1_CCSID and 2_CCSID to the specified CCSID values for each operand. After these values are set, the 4th byte of the instruction prefix is used as an index into a second branch table that branches to the code to emulate the instruction. When the code to emulate the instruction is entered the registers from the first block of code along with the values in 1_CCSID and 2_CCSID contain the necessary parameters to emulate the instruction. Long name manager 204 performs the requested operation and returns a result that is passed to legacy application 108. Thus, legacy application 108 obtains a result of an operation that ordinarily would not have been performed by legacy application 108.

The operation of environment 100 may be better understood by reference to particular examples of the types of operations involved. Commonly, an application includes operations performed on characters, such as Compare Logical Characters (CLC) and Move Characters (MVC). Legacy applications 108 may have limits on the size of characters that can be processed. Moreover, when tokens or other indicators are used to represent longer fields, such functions may not work. In addition, older legacy applications 108 may use EBCDIC characters, while later applications often use UNICODE character definitions, which are more flexible and allow a broader range of characters. Moreover, older legacy applications 108 may use fixed-length character fields, while later applications may allow variable-length character ("varchar") fields. One way to solve this problem is to modify legacy applications 108 to call functions from long name manager 204 directly. However, the function calls themselves may need to be programmed into legacy applications, which may require considerable time and effort. In cases where the CLC and MVC operations may only be performed on characters of a certain type, for example, it may not be straightforward to modify legacy application 108 to handle function calls for long name manager 204.

The alternative in various embodiments is to modify the character operations slightly to handle indicators representing functions of long name manager 204. This involves constructing an algorithm, such as a macro, that includes the original CLC or MVC functions, with a modification to handle the indicator. Indicators have a smaller size than the related function call, and consequently, modifying the CLC or MVC operations to CLC$ or MVC$, respectively, to recognize indicators is relatively less demanding than function calls. For example, MVC$ may be considered a "wrapper" into emulator 202. It allows existing MVC instructions to easily be changed. One example implementation of MVC$ is:

```
            MACRO
&LABEL     MVC$    &OP1,&OP2
.*
.*
.* MVC$ - Emulate an MVC instruction.
.*
&LABEL     EMULATE,
+
                   INS=MVC,
+
                   OP1=&OP1,
+
                   OP2=&OP2
           MEND
```

In another example, CLC$ may be considered a "wrapper" into emulator 202. It allows existing CLC instructions to easily be changed. One example implementation of CLC$ is:

```
            MACRO
&LABEL     CLC$    &OP1,&OP2
.*
.*
.* CLC$ - Emulate a CLC instruction.
.*
&LABEL     EMULATE,
+
                   INS=CLC,
+
                   OP1=&OP1,
+
                   OP2=&OP2
           MEND
```

Further, retaining the original operations allows operations that legacy application 108 is capable of performing to be performed without the added complexity of calls to long name manager 204. Modified operations may establish, initialize, or utilize BSA 122 as appropriate. For example, if legacy application 108 needed to determine whether a character value was larger or smaller than another character value, the modified CLC instruction (CLC$) could look for an indicator to indicate whether either of the characters was of a type that the CLC instruction cannot handle. If the characters cannot be handled, the instruction can be passed to emulator 202, which generates a long name instruction to compare the character values. In another example, a modified MVC instruction (MVC$) may pass the instruction to emulator 202 when conversions on characters from one format to another, such as from EBCDIC to UNICODE. Thus, for example, if characters were being moved from legacy application 108 using EBCDIC to another API using UNICODE, MVC$ could call a character conversion function from long name manager 108. Otherwise, MVC$ could execute an unmodified MVC operation. Similarly, MVC$ could be modified to move characters from an API using fixed length characters to an API allowing variable-length characters or to perform the reverse operation.

FIG. 2 is a layer diagram 200 illustrating an example layer structure for environment 100. Emulator 202 receives instructions from legacy application 108 and returns results of operations. Emulator 202 in turn is in communication with long name manager 204. Long name manager 204 is illustrated in communication with two other layers: token manager 206 and character converter 208. Long name manager 204 responds to long name instructions by making use of these layers. Token manager 206 allows tokens in fields to be expanded to full size in order for operations to be performed on the fields. Token manager 206 may include character operations or any other operations performed on expanded fields. Character converter 208 converts one field type to another. For example, character converter 208 may have a table that maps EBCDIC characters to UNICODE characters.

The depicted layer structure may be embodied in a variety of ways, including the server-client architecture illustrated in FIG. 1. Numerous types of hardware, firmware, software and/or protocols may be used in different layers, so that, for example, layers may represent the communication of different APIs. Similarly, one or more layers may be programmed as modules in a common API. The intercommunication between the layers is illustrative of a particular embodiment, but it is also possible to have different forms of intercommunication as well. For example, emulator 202 may interact directly with token manager 206 or character converter 208. Thus, the depicted layer diagram 200 is only one example of numerous possible embodiments.

FIG. 3 is a flow chart illustrating an example method 300 of operation using modified instructions. Legacy application 108 receives a request for to perform an operation that includes one or more fields at step 302. Legacy application 108 invokes modified operation 160 at step 304. Modified operation 160 determines whether the request is compatible with the unmodified operation at decision step 306. For example, modified operation 160 may determine whether there is an indicator or token included in one or more of the fields indicating that the field is incompatible with the unmodified operation. If the request is compatible with the unmodified operation, modified operation 160 performs the unmodified operation on the one or more fields at step 308. Modified instruction 150 then returns a result at step 310, ending the method. If the request is incompatible with the unmodified operation, modified operation 160 communicates request 150 to emulator 202 at step 312. Emulator 202 converts request 150 into a long name instruction at step 314. Long name manager 204 executes the long name instruction at step 316 and returns a result at step 318. Emulator 202 communicates the result to legacy application 108 at step 320, ending the method.

The preceding flowchart 300 and accompanying description illustrate an example method, but numerous other similar or distinct methods could be employed or implemented as well. In short, environment 100 contemplates using or executing any suitable technique or process for performing these and other tasks. In particular, any method of operation suitable for use with any of the embodiments of environment 100 described herein is contemplated within this disclosure. Accordingly, many of the steps in this flowchart may take place simultaneously and/or in different orders than as shown. Moreover, environment 100 may use methods with additional steps, fewer steps, and/or different steps, so long as the methods are consistent with any of the techniques for managing field incompatible with legacy applications 108 described or suggested by this disclosure.

Although this disclosure has been described in terms of certain embodiments and generally associated methods, alterations and permutations of these embodiments and methods will be apparent to those skilled in the art. For example, operations could be performed on any number of fields and other types of compatibility issues between legacy applications 108 and various fields could be contemplated. Accordingly, the above description of example embodiments does not define or constrain this disclosure. Other changes, substitutions, and alterations are also possible without departing from the spirit and scope of this disclosure.

What is claimed is:

1. A computer-implemented method for performing operations on fields, comprising:

receiving, by a computing device, a request to perform a requested operation on one or more fields, wherein a first operation operating on the computing device performs the requested operation when the one or more fields are in a format that is compatible with the first operation;

determining, by the computing device, whether the one or more fields are compatible with the first operation;

when the one or more fields are in a format that is compatible with the first operation, performing, by the first operation operating on the computing device, the requested operation on the one or more fields using the first operation to generate results of the requested operation on the one or more fields; and when the one or more fields are in a format that is not compatible with the first operation for at least a reason that at least one of the one or more fields includes a token representing additional information and an expanded size of the at least one of the one or more fields with the additional information would exceed a maximum field size for the first operation:

generating one or more instructions that emulate the first operation, wherein the generated one or more instructions are compatible with the requested operation on the one or more fields, generating a request to perform a second operation, the request including the generated one or more instructions, wherein the second operation performs the requested operation by processing the generated one or more instructions including performing the requested operation on the at least one of the one or more fields with the additional information, and receiving results from the second operation.

2. The computer-implemented method of claim 1, wherein: the one or more fields are character fields; and at least one of the one or more fields is a variable-length character field.

3. The computer-implemented method of claim 1, wherein the requested operation is selected from the group consisting of a Compare Logical Characters (CLC) operation and a Move Character (MVC) operation.

4. The computer-implemented method of claim 1, wherein determining whether the one or more fields are compatible with the first operation comprises:

determining whether the one or more fields include the token; and if the one or more fields include the token, determining based at least in part on the token whether the one or more fields are compatible with the first operation.

5. The computer-implemented method of claim 1, wherein:

the requested operation comprises a Move Character (MVC) operation requiring a moved character to be converted from a first character format to a second character format; and the second operation comprises a character converter operable to convert the moved character from the first character format to the second character format.

6. The computer-implemented method of claim 5, wherein:
the first character format is Extended Binary Coded Decimal Interchange Code (EBCDIC); and
the second character format is Unicode.

7. The computer-implemented method of claim 1, wherein said generating one or more instructions that emulate the first operation further comprises:
examining the first operation; and
determining information that is used to emulate the first operation from the examined first operation, wherein the generated one or more instructions are based on the determined information.

8. The computer-implemented method of claim 1, wherein the second operation is executed on a second computing device that is remote to the computing device.

9. A computer readable medium storing computer executable instructions for performing operations on fields, the computer executable instructions operable when executed by one or more processors to cause the one or more processors to perform a plurality of operations comprising:
receiving, at an application, a request to perform a requested operation on one or more fields, the application comprising a first operation operable to perform the requested operation when the one or more fields are in a format that is compatible with the first operation;
determining whether the one or more fields are compatible with the first operation;
when the one or more fields are in a format that is compatible with the first operation, performing the requested operation on the one or more fields using the first operation to generate results of the requested operation on the one or more fields; and
when the one or more fields are in a format that is not compatible with the first operation for at least a reason that at least one of the one or more fields includes a token representing additional information and an expanded size of the at least one of the one or more fields with the additional information would exceed a maximum field size for the first operation:
generating one or more instructions that emulate the first operation, wherein the generated one or more instructions are compatible with the requested operation on the one or more fields,
generating a request to perform a second operation, the request including the generated one or more instructions, wherein the second operation performs the requested operation by processing the generated one or more instructions including performing the requested operation on the at least one of the one or more fields with the additional information, and
receiving results from the second operation.

10. The computer readable medium of claim 9, wherein:
the one or more fields are character fields; and
at least one of the one or more fields is a variable-length character field.

11. The computer readable medium of claim 9, wherein the requested operation is selected from the group consisting of a Compare Logical Characters (CLC) operation and a Move Character (MVC) operation.

12. The computer readable medium of claim 9, wherein the determining whether the one or more fields are compatible with the first operation comprises:
determining whether the one or more fields include the token; and
if the one or more fields include the token, determining based at least in part on the token whether the one or more fields are compatible with the first operation.

13. The computer readable medium of claim 9, wherein:
the requested operation comprises a Move Character (MVC) operation requiring a moved character to be converted from a first character format to a second character format; and
the second operation comprises a character converter operable to convert the moved character from the first character format to the second character format.

14. The computer readable medium of claim 13, wherein:
the first character format is Extended Binary Coded Decimal Interchange Code (EBCDIC); and
the second character format is Unicode.

15. The computer readable medium of claim 9, wherein said generating one or more instructions that emulate the first operation further comprises:
examining the first operation; and
determining information that is used to emulate the first operation from the examined first operation, wherein the generated one or more instructions are based on the determined information.

16. The computer readable medium of claim 9, wherein the first operation is executed on a first computing device and the second operation is executed on a second computing device.

17. A system for performing operations on fields, comprising:
one or more processors configured to execute an application, the application comprising:
a first operation configured to:
perform a requested operation on one or more fields to generate results of the requested operation when the one or more fields are in a format that is compatible with the first operation, wherein at least one of the one or more fields comprises a token representing additional information, wherein an expanded size of the at least one of the one or more fields with the additional information would exceed a maximum field size for the first operation; and
a second operation configured to:
determine whether the one or more fields are compatible with the first operation,
generate one or more instructions that emulate the first operation, wherein the generated one or more instructions are compatible with the requested operation on the one or more fields in response to detecting that the one or more fields are not compatible with the first operation,
generate a request to perform a third operation, the request including the generated one or more instructions, wherein the third operation performs the requested operation by processing the generated one or more instructions including performing the requested operation on the at least one of the one or more fields with the additional information, and
receive results from the third operation.

18. The system of claim 17, wherein the second operation is operable to determine whether the one or more fields are compatible with the first operation when the one or more fields include the token representing additional information.

19. The system of claim 17, wherein:
the requested operation comprises a Move Character (MVC) operation requiring a moved character to be converted from a first character format to a second character format; and the second operation comprises a character converter operable to convert the moved character from the first character format to the second character format.

20. The system of claim 17, wherein the requested operation comprises a Compare Logical Characters (CLC) operation.

21. The system of claim 17, wherein:

the one or more fields comprise character fields;

the requested operation requires at least one of the one or more fields to be converted from a first character format to a second character format; and the third operation is operable to convert the at least one of the one or more fields from the first character format to the second character format.

22. The system of claim 21, wherein:

the first character format is Extended Binary Coded Decimal Interchange Code (EBCDIC); and the second character format is Unicode.

23. The system of claim 17, wherein said generate one or more instructions that emulate the first operation further comprises:

examining the first operation; and determining information that is used to emulate the first operation from the examined first operation, wherein the generated one or more instructions are based on the determined information.

24. The system of claim 17, wherein the first operation is executed on a first computing device and the second operation is executed on a second computing device.

* * * * *